United States Patent [19]

Wu

[11] Patent Number: 5,048,140
[45] Date of Patent: Sep. 17, 1991

[54] CLEANING DEVICE FOR FISH TANK

[76] Inventor: Hans Wu, No. 78, Chung-Shan Wu St., Tainan City, Taiwan

[21] Appl. No.: 653,368

[22] Filed: Feb. 12, 1991

[51] Int. Cl.$^5$ .............................................. E04H 3/20
[52] U.S. Cl. ...................................... 15/1.7; 210/169
[58] Field of Search .................. 15/1.7, 345; 210/169

[56] References Cited

U.S. PATENT DOCUMENTS

| | | | |
|---|---|---|---|
| 3,816,026 | 6/1974 | Isaacson et al. | 210/169 |
| 3,826,371 | 7/1974 | Adamson | 15/1.7 X |
| 3,961,393 | 6/1976 | Pansini | 15/1.7 |
| 4,290,883 | 9/1981 | Sama | 15/1.7 |

Primary Examiner—Edward L. Roberts
Attorney, Agent, or Firm—Breneman & Georges

[57] ABSTRACT

A cleaning device for fish tank includes a hood with a bottom open end and a constricted top open end, a suction pipe connected to the top open end of the hood, and a closed hollow casing for receiving water connected to the bottom open end to close the same. The hollow casing has an opening communicating the interior and exterior of the hood, and a wall defining the opening. The wall is provided with a plurality of spraying holes, and the casing has a top face provided with a plurality of spraying holes. A hollow housing extends beyond the bottom open end and has an interior space which is communicated with the interior of the casing. The hollow housing has a water inlet.

2 Claims, 6 Drawing Sheets

CLEANING DEVICE FOR FISH TANK

FIELD OF THE INVENTION

This invention relates to a cleaning device, more particularly to a cleaning device for fish tank. It is convenient and efficient to use the cleaning device for cleaning a fish tank.

BACKGROUND OF THE INVENTION

Referring to FIG. 1, a conventional cleaning device for fish tank includes an outlet pipe 11, an air suction and exhaust member 12 connected to one end of the outlet pipe 11, a connecting pipe 13 with one end connected to the other end of the outlet pipe 11, and a hood 14 connected to the other end of the connecting pipe 13. The hood 14 of the cleaning device has a bottom open end 141 vertically disposed on gravel (A) above the bottom of the fish tank. While operating the member 12, waste material and water on the gravel (A) is drawn out through the hood 14, the connecting pipe 13, and the outlet pipe 11 by siphonic action. The hood 14 can be moved to every part on the gravel (A) for cleaning waste material thereon.

The conventional cleaning device for cleaning a fish tank draws a lot of water out of the tank and weak suction is provided by siphonic action to make the device truly effective. When more than a third of all water in the fish tank is removed and replaced with fresh water, the fish have a hard time adapting to a new environment and often die as a result. The weak suction fails to remove waste material under or among the gravel stones and the fish tank can not be completely cleaned.

So that it is inconvenient and inefficient to use a conventional cleaning device for cleaning a fish tank.

SUMMARY OF THE INVENTION

Therefore, the object of this invention is to provide a cleaning device which is convenient and efficient for cleaning a fish tank.

Accordingly, a cleaning device for fish tank of this invention includes a hood with a bottom open end and a constricted top open end, a suction pipe connected to the top open end of the hood, and a closed hollow casing for receiving water connected to the bottom open end to close the same. The hollow casing has a wall defining an opening which communicates the interior and the exterior of the hood. The wall is provided with a plurality of spraying holes, and the casing has a top face provided with a plurality of spraying holes. A hollow housing extends beyond the bottom open end and has an interior space which is communicated with the interior of the casing. The hollow housing has a water inlet.

BRIEF DESCRIPTION OF THE DRAWINGS

Other features and advantages of this invention will become apparent in the following detailed description of the preferred embodiment with reference to the accompanying drawings, of which.

DETAILED DESCRIPTION OF THE PREFERRED EMBODIMENT

Figure 1:
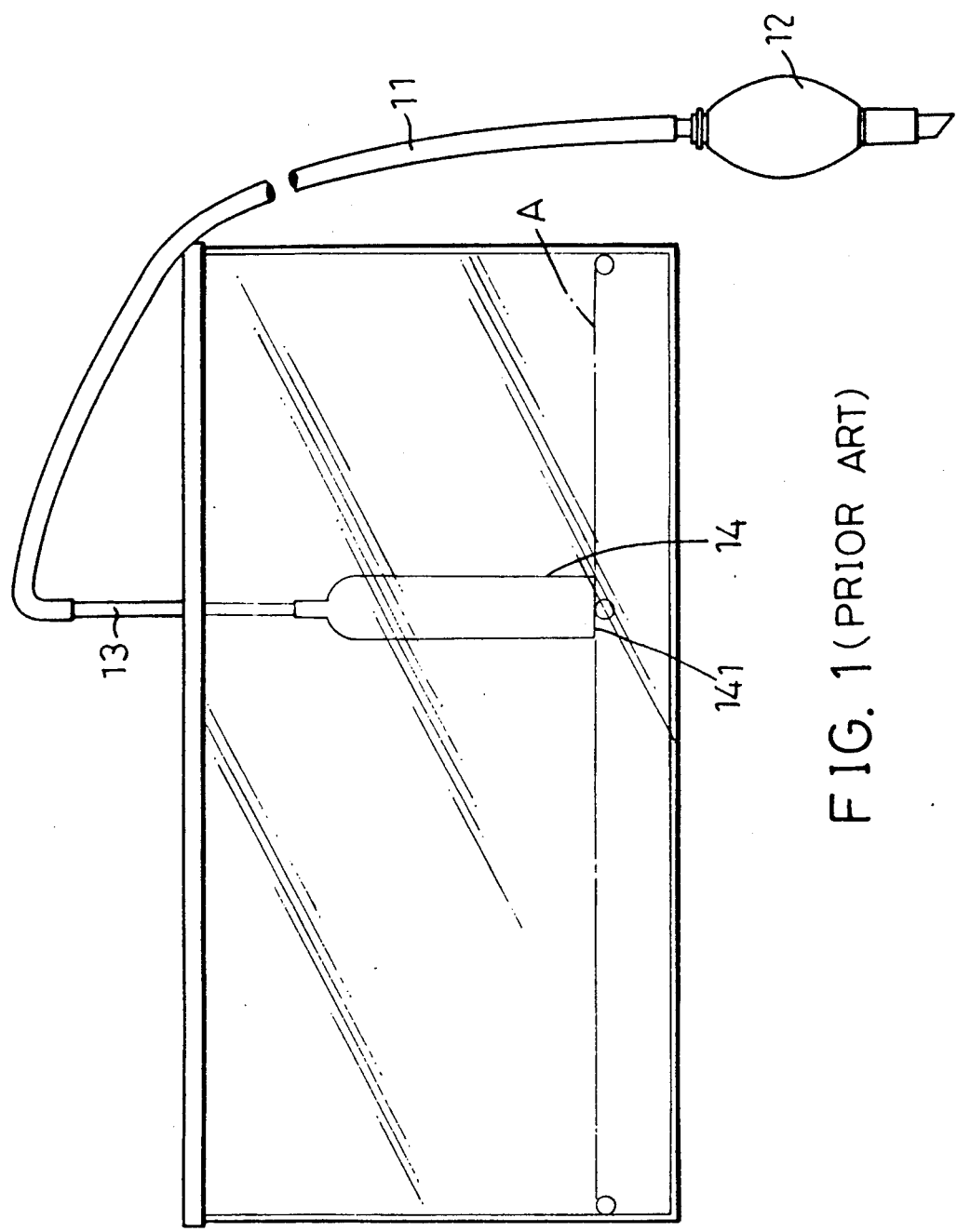
FIG. 1 is a schematic view of a conventional cleaning device for a fish tank.
Figure 2:
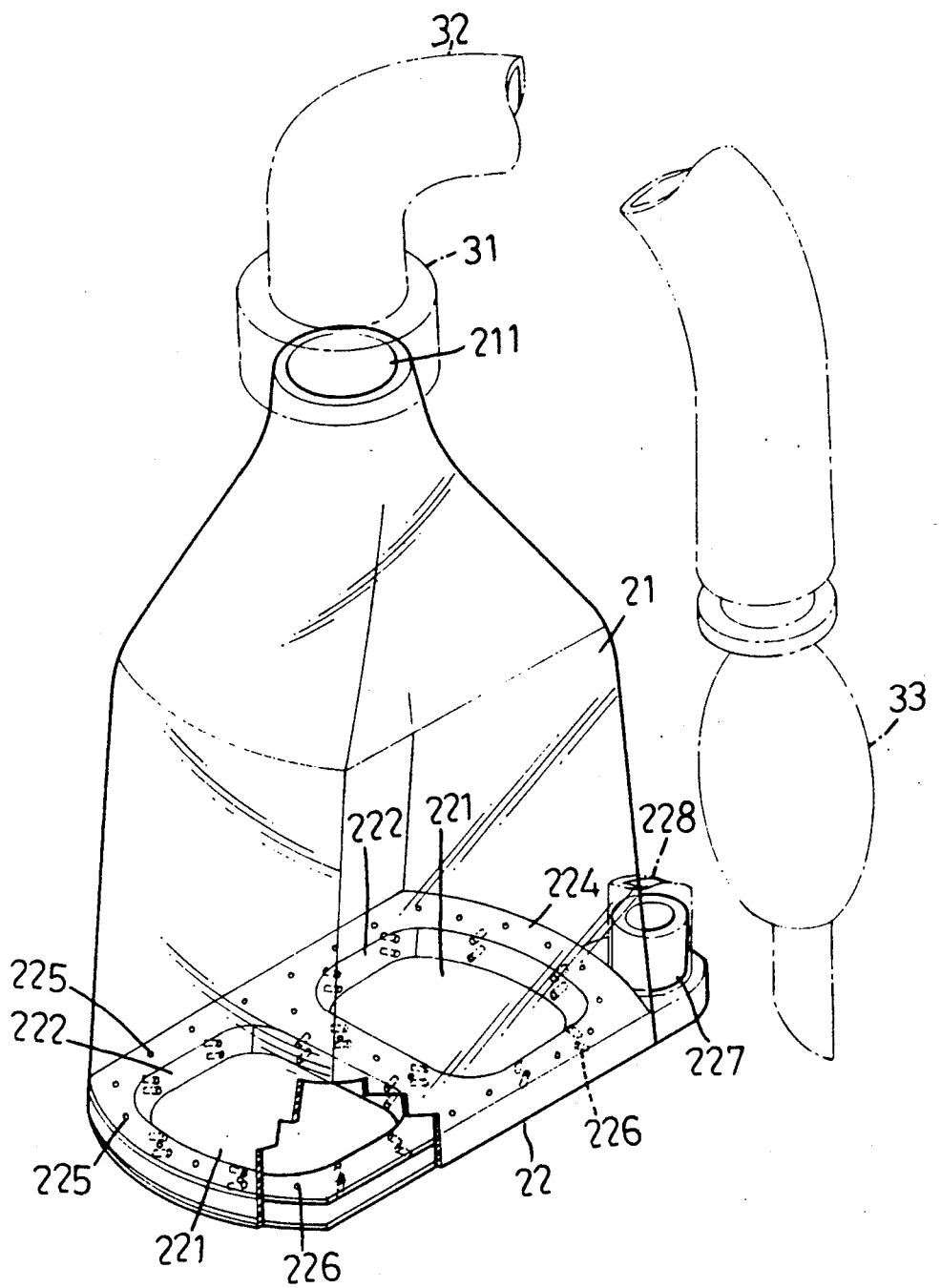
FIG. 2 is a perspective exploded view of a preferred embodiment of a cleaning device of this invention.

Referring to FIG. 2, a cleaning device of this invention for a fish tank includes a hood 21 with a constricted top open end 211 and a bottom open end, a joint member 31 connected to the top open end 211, an outlet pipe 32 connected to the joint member 31, and an air suction and exhaust member 33 connected to the outlet pipe 32.

Referring to FIG. 2, a rectangular closed hollow casing 22 for receiving water is connected to the bottom open end of the hood 21 to close the same. The hollow casing 22 has two openings 221 formed therethrough to communicate the interior and exterior of the hood 21, and two walls 222 respectively defining the openings 221. The top face 224 of the casing 22 has a plurality of spraying holes 225. Each of the walls 222 is provided with a plurality of inclined holes 226 for spraying water. A hollow housing 227 extends beyond the bottom open end and has an interior space which is communicated with the interior of the casing 22. The hollow housing 227 has a water inlet 228.

Figure 3:
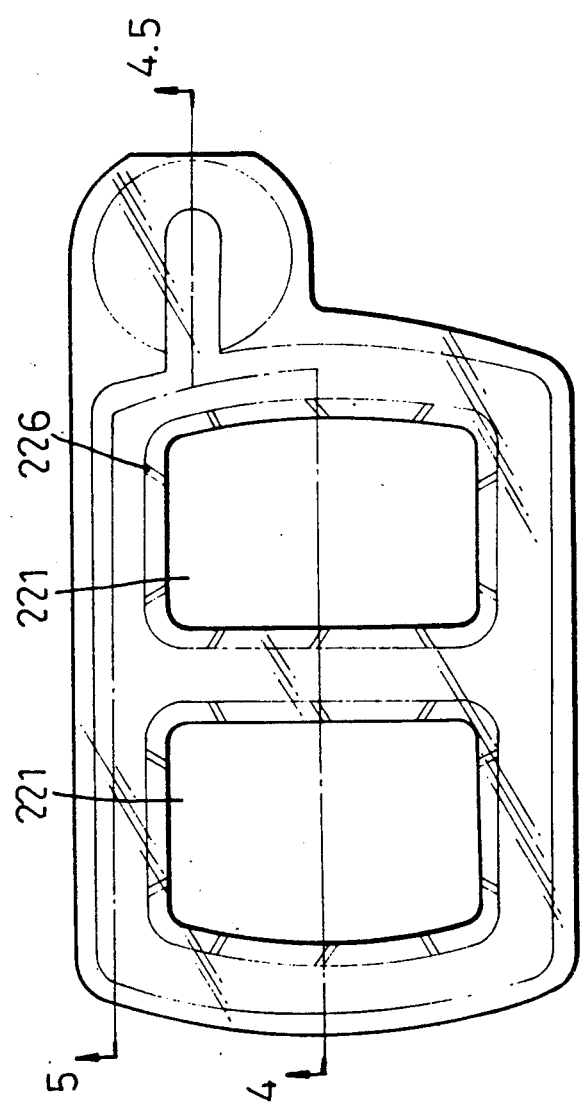
FIG. 3 is a bottom plane view of the preferred embodiment of the cleaning device of this invention.
Figure 4:
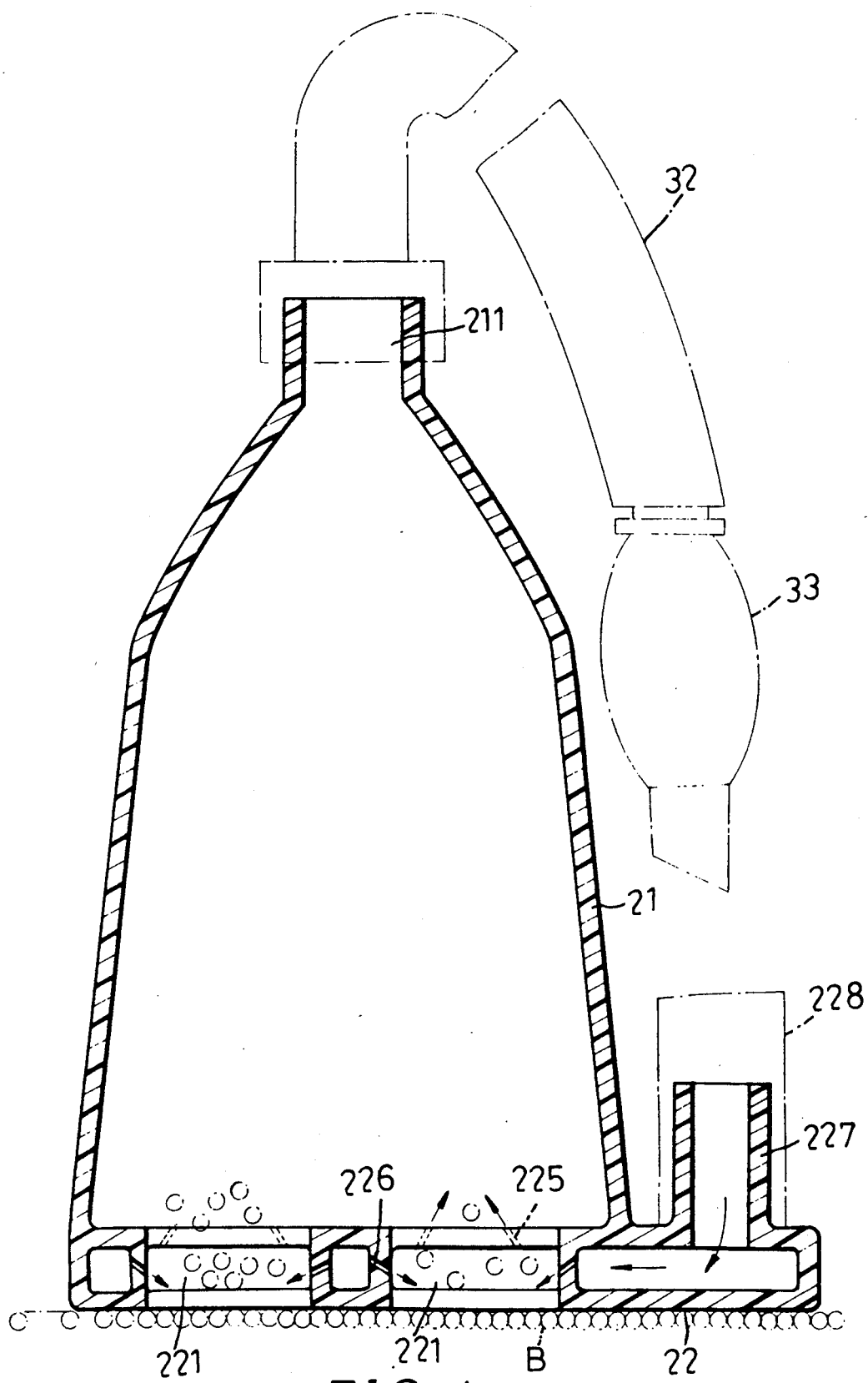
FIG. 4 is a sectional view of FIG. 2 taken along the line 4—4 shown in FIG. 3.
Figure 5:
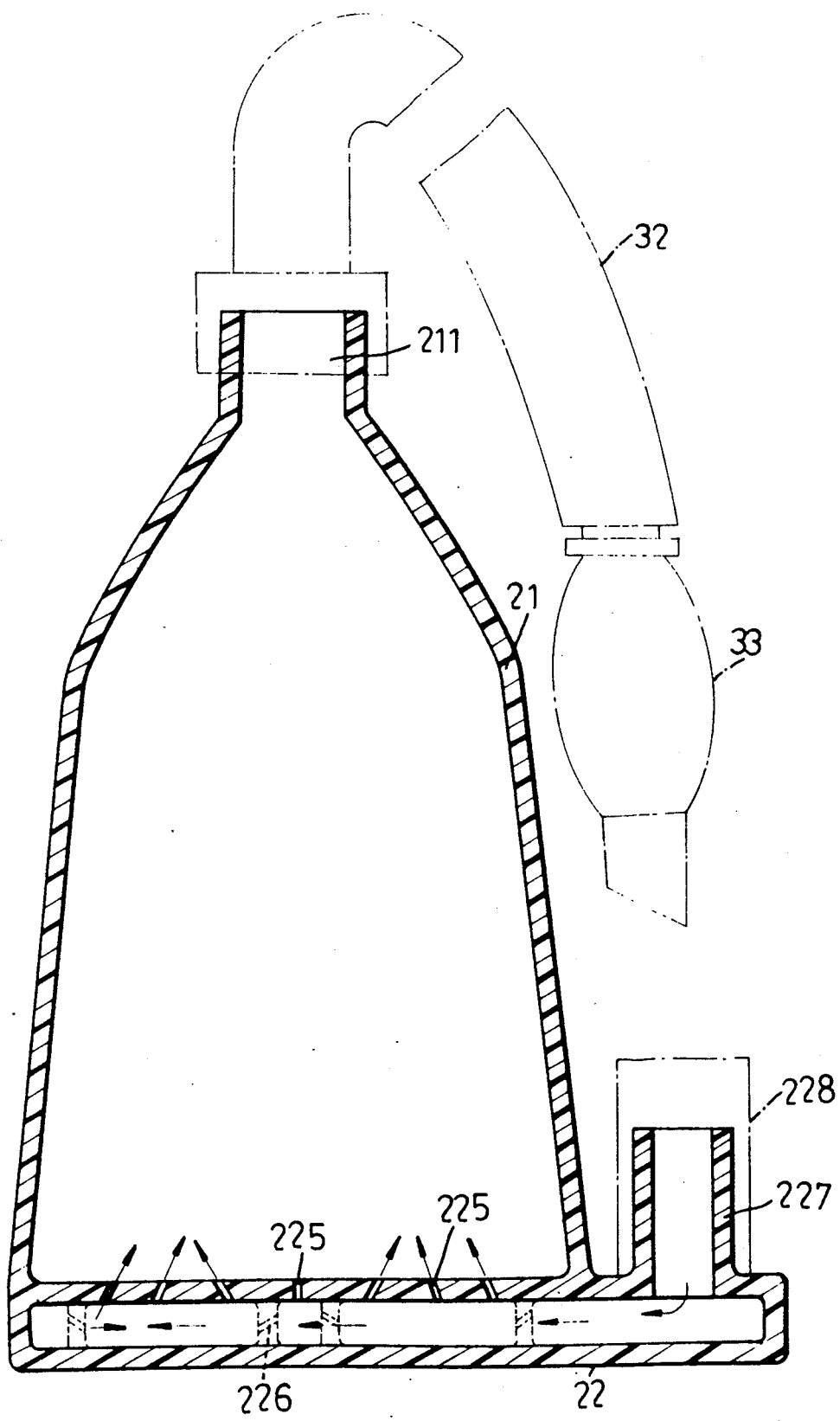
FIG. 5 is a sectional view of FIG. 2 taken along the line 5—5 shown in FIG. 3.

Referring to FIGS. 3, 4, and 5, a cleaning device of this invention is disposed on gravel (B) in a fish tank. Suction is provided by the air suction and exhaust member 33, which impels water into the hollow casing 22 through the water inlet 228 and the hollow housing 227. Water then sprays out through the holes 225 or 226. Under such conditions, waste material on or among the gravel stones (B) is extracted by the spray from the holes. The waste material, the sprayed water, and some of the water originally present in the fish tank are drawn out through the hood 21 and the outlet pipe 32 by siphonic action. Fresh water introduced from the casing 22 mixes with the water originally in the fish tank and is drawn out by siphonic action, so the volume of water left in the fish tank after cleaning with the device of this invention is larger than that left by the conventional cleaning device. Thus since only a little fresh water needs to be added to the fish tank, fish can more easily adapt to the new environment and won't die as readily.

A second cleaning device like the preferred embodiment of this invention described above and without an air suction and exhaust member is attached to a side wall of a fish tank. The second cleaning device is full of water and is uprightly disposed on the gravel (B). Under such conditions, waste material in the fish tank can be cleaned out by siphonic action.

Figure 6:
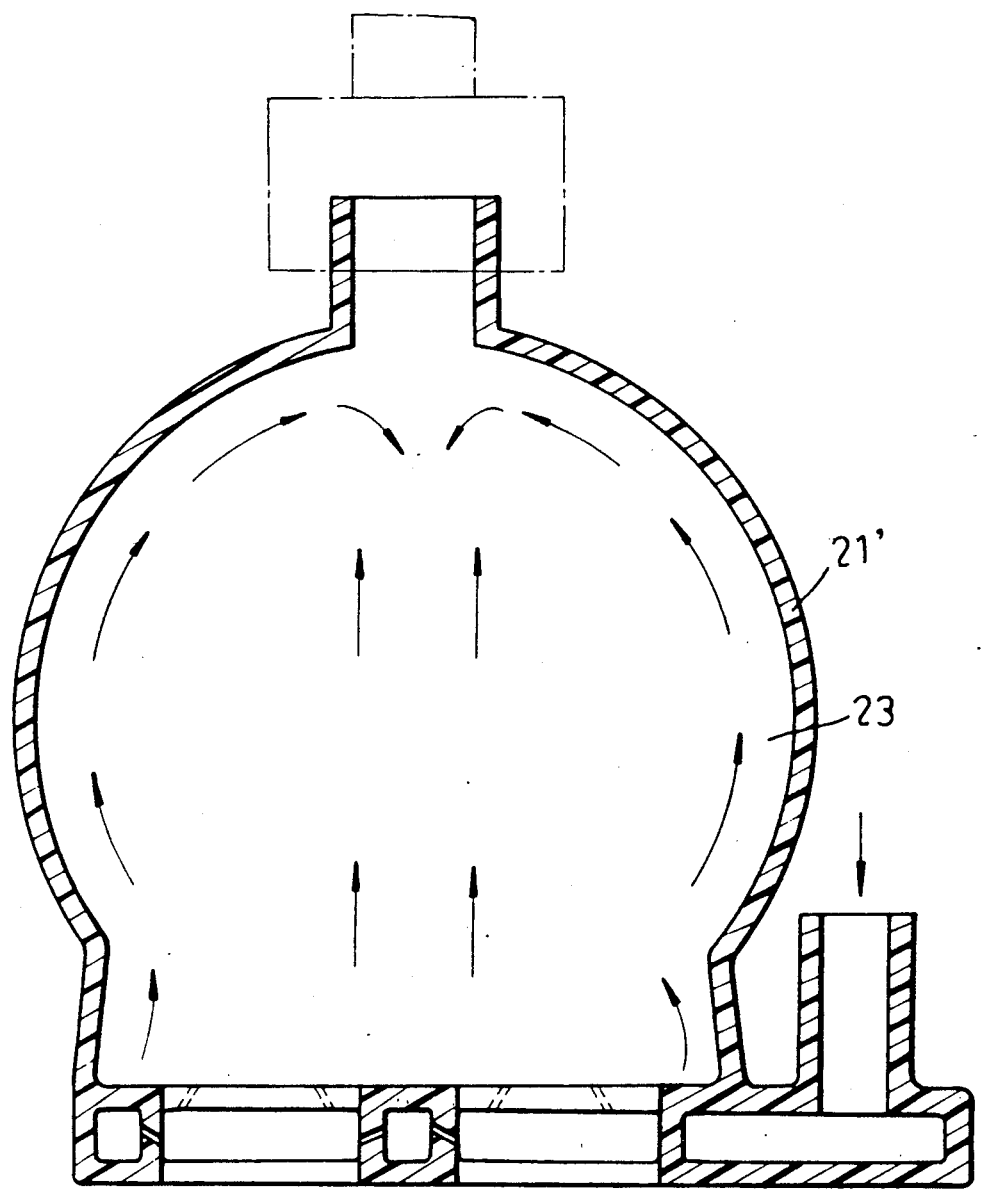
FIG. 6 is a sectional view of another preferred embodiment of the cleaning device of this invention.

Another cleaning device of this invention is shown in FIG. 6. This cleaning device is similar to the first preferred embodiment of a cleaning device shown in FIG. 2 and has a hood 21' with an enlarged intermediate arcuate wall 23. Gravel raised by siphonic action in using this cleaning device can fall down and not drawn out of the tank.

Therefore, a cleaning device of this invention more conveniently and efficiently cleans a fish tank than a conventional cleaning device.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A cleaning device for fish tank comprising:
   a hood with a bottom open end and a constricted top open end;
   a suction pipe connected to said top open end of said hood; and
   a closed hollow casing for receiving water therein connected to said bottom open end to close the same, said hollow casing having an opening formed therethrough to communicate the interior and exterior of said hood, and a wall defining said opening, said wall being provided with a plurality of spraying holes, said casing having a top face provided with a plurality of spraying holes, a hollow housing extending beyond said bottom open end and having an interior space communicating with the interior of said casing, said hollow housing having a water inlet.

2. A cleaning device claimed as claim 1, wherein said hood has an enlarged intermediate arcuate wall.

* * * * *